United States Patent
Yu

(10) Patent No.: US 9,744,970 B2
(45) Date of Patent: Aug. 29, 2017

(54) ESTIMATING A TRAILER ROAD GRADE

(71) Applicant: FORD GLOBAL TECHNOLOGIES, LLC, Dearborn, MI (US)

(72) Inventor: Hai Yu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 166 days.

(21) Appl. No.: 14/330,622

(22) Filed: Jul. 14, 2014

(65) Prior Publication Data

US 2016/0009288 A1 Jan. 14, 2016

(51) Int. Cl.
| | |
|---|---|
| *B60T 7/20* | (2006.01) |
| *B60W 40/076* | (2012.01) |
| *B60W 40/13* | (2012.01) |
| *B62D 13/06* | (2006.01) |
| *B60W 50/14* | (2012.01) |
| *B60T 8/17* | (2006.01) |

(52) U.S. Cl.
CPC ............ *B60W 40/076* (2013.01); *B60T 7/20* (2013.01); *B60T 8/1708* (2013.01); *B60W 40/13* (2013.01); *B60W 50/14* (2013.01); *B62D 13/06* (2013.01); *B60T 2230/08* (2013.01); *B60T 2250/02* (2013.01)

(58) Field of Classification Search
CPC .... B60W 40/076; B60W 40/13; B60W 50/14; B62D 13/06; B60T 7/20; B60T 8/1708; B60T 2230/08; B60T 2250/02
USPC ..................................................... 701/41–43
See application file for complete search history.

(56) References Cited

U.S. PATENT DOCUMENTS

| | | | | |
|---|---|---|---|---|
| 5,187,977 | A | * | 2/1993 | Koschorek ............... G01C 9/00 33/521 |
| 6,684,140 | B2 | | 1/2004 | Lu et al. |
| 8,793,035 | B2 | * | 7/2014 | Yu .......................... B60W 40/13 280/432 |
| 2003/0216847 | A1 | * | 11/2003 | Bellinger .......... B60W 30/1819 701/51 |
| 2003/0236603 | A1 | | 12/2003 | Lu |
| 2010/0100272 | A1 | | 4/2010 | Chen et al. |
| 2011/0087398 | A1 | | 4/2011 | Lu et al. |
| 2014/0052337 | A1 | | 2/2014 | Lavoie et al. |
| 2014/0067154 | A1 | | 3/2014 | Yu et al. |
| 2014/0067155 | A1 | | 3/2014 | Yu et al. |

FOREIGN PATENT DOCUMENTS

| | | |
|---|---|---|
| FR | 2846086 | 4/2004 |
| JP | 3592463 | 5/1998 |
| JP | 3858629 | 12/2002 |
| JP | 2002371876 | 12/2002 |
| JP | 2014020436 | 2/2014 |

OTHER PUBLICATIONS

Zhang, K. and H.C. Frey. Road Grade Estimation for On-Road Vehicle Emissions Modeling Using Lidar Data, Proceedings, Annual Meeting of the Air & Waste Management Association, Jun. 20-23, 2005, Minneapolis, MN, pp. 1-22.
U.S. Appl. No. 14/065,757, filed Oct. 29, 2013.

* cited by examiner

*Primary Examiner* — Richard Camby
(74) *Attorney, Agent, or Firm* — Carlson, Gaskey & Olds, P.C.

(57) ABSTRACT

An example trailer road grade estimating method includes calculating a road grade beneath a trailer vehicle based on a difference between a first estimated mass and a second estimated mass.

22 Claims, 2 Drawing Sheets

ESTIMATING A TRAILER ROAD GRADE

BACKGROUND

This disclosure relates generally to estimating a road grade. More particularly, the disclosure relates to estimating a road grade for a trailer vehicle that is reversing.

Towing vehicles tow trailer vehicles. A truck is an example towing vehicle. A boat is an example trailer vehicle. Both are example vehicles.

Variations in road grades may cause a trailer vehicle to exert forces in a different way on the towing vehicle. For example, when a trailer vehicle and towing vehicle are reversing, an increasing road grade may cause a trailer vehicle to exert increasing pulling force on the towing vehicle. The towing vehicle needs to account for the increasing pulling force by applying greater braking pressure for example.

When an operator of a vehicle is backing up a trailer, the operator is ordinarily able to accommodate changes in force due to variations in road grade. It may be desirable to assist an operator with these changes when backing up the trailer vehicle using an automatic backup system.

SUMMARY

A trailer road grade estimating method according to an exemplary aspect of the present disclosure includes, among other things, calculating a road grade beneath a trailer vehicle based on a difference between a first estimated mass and a second estimated mass.

In a further example of the foregoing method, the method includes calculating the first estimated mass when the trailer vehicle is at a first position and calculating the second estimated mass when the trailer vehicle is at a second position different than the first position.

In a further example of any of the foregoing methods, the method comprises pushing the trailer with a towing vehicle to move the trailer vehicle from the first position to the second position.

In a further example of any of the foregoing methods, the first estimated mass comprises an estimate of a total mass of the trailer vehicle and a total mass of a towing vehicle.

In a further example of any of the foregoing methods, the method includes running an automatic backup assist for a towing vehicle coupled with the trailer vehicle during the calculating.

In a further example of any of the foregoing methods, a variation between a grade beneath a towing vehicle and a grade beneath the trailer vehicle causes the difference between a first estimated mass and a second estimated mass.

In a further example of any of the foregoing methods, the calculating comprises deriving the road grade according to a formula where the road grade is $$a\sin\left[\frac{(\tilde{M}_c - M_c)a_x^s}{(M_c - m_{trk}^*)g} + \sin\alpha_{r1}\right].$$

In a further example of any of the foregoing methods, the method includes braking a towing vehicle, the trailer vehicle, or both in response to an increase in the road grade.

In a further example of any of the foregoing methods, the braking comprises friction braking.

In a further example of any of the foregoing methods, the method includes sending a warning to an operator of the towing vehicle if the road grade exceeds a threshold value.

In a further example of any of the foregoing methods, the method includes pausing an automatic backup operation if the road grade exceeds a threshold value.

In a further example of any of the foregoing methods, the method includes calculating the total road grade load torque on the towing vehicle.

In a further example of any of the foregoing methods, the method the total road grade load torque is calculated according to a formula wherein the total road grade load torque is:

$$(M_c - m_{trk}^*)g \sin\alpha_{r2} + m_{trk}^* g \sin\alpha_{r1}.$$

A vehicle control assembly according to an exemplary aspect of the present disclosure includes, among other things, a vehicle controller that estimates a grade for a trailer vehicle based on a difference between a first estimated mass and a second estimated mass.

In a further example of the foregoing assembly, the first estimated mass is calculated when the trailer vehicle is at a first position and the second estimated mass is calculated when the trailer vehicle is at a second position different than the first position.

In a further example of any of the foregoing assemblies, the trailer vehicle is moved in reverse from the first position to the second position.

In a further example of any of the foregoing assemblies, the vehicle controller estimates the road grade using a formula where the road grade is $$a\sin\left[\frac{(\tilde{M}_c - M_c)a_x^s}{(M_c - m_{trk}^*)g} + \sin\alpha_{r1}\right].$$

In a further example of any of the foregoing assemblies, the assembly includes a friction brake. The vehicle controller to increase braking force from the friction brake in response to an increase in the road grade.

In a further example of any of the foregoing assemblies, the vehicle controller is further configured to execute a program causing a towing vehicle to automatically back up the trailer vehicle.

In a further example of any of the foregoing assemblies, the towing vehicle houses the vehicle controller.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
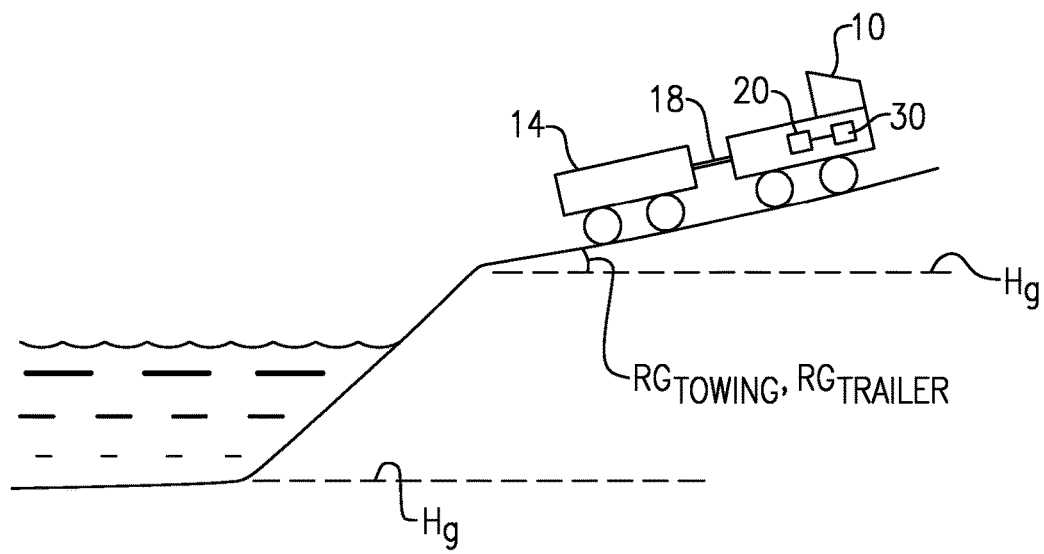
FIG. 1 illustrates an example towing vehicle and trailer vehicle.

Referring to the example of FIG. 1, a towing vehicle 10 tows a trailer vehicle 14. The towing vehicle 10 is a truck in this example, and the trailer vehicle 14 is a boat trailer. Both are example vehicles. A mechanical arm 18 couples the towing vehicle 10 to the trailer vehicle 14.

Figure 2:
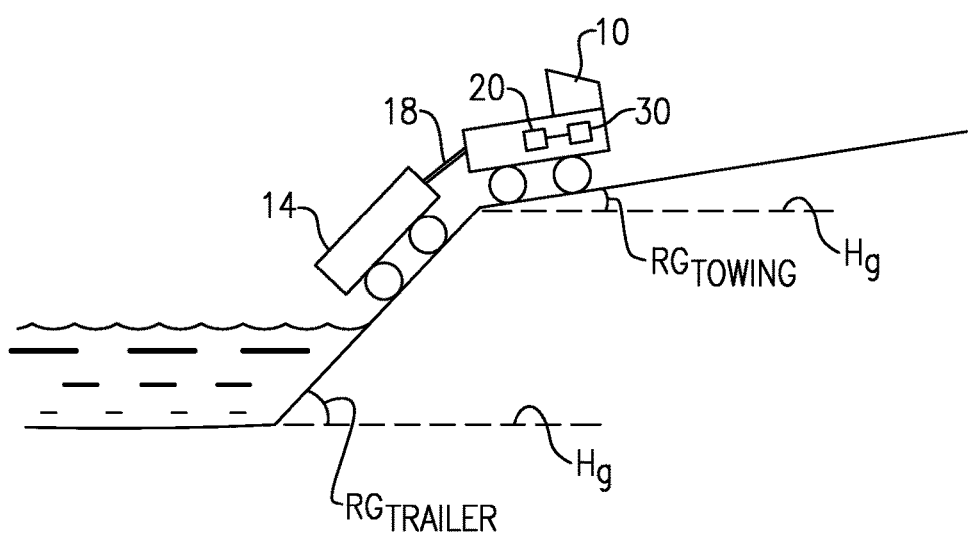
FIG. 2 illustrates the towing vehicle and the trailer vehicle of FIG. 1 after reversing.

In this example, the towing vehicle 10 is reversing to move the trailer vehicle 14 from the position of FIG. 1 to the position of FIG. 2. Since the example trailer vehicle 14 is boat trailer, an operator of the towing vehicle 10 may be reversing to move the trailer vehicle 14 into in a body of water at a boat lift, for example.

For a given vehicle towed, its associated road grade is, generally, a grade (or slope) of an area beneath the vehicle. Road grade can be expresses as a percentage of variation from a horizontal (zero) grade $H_g$.

A towing vehicle road grade $RG_{TOWING}$ is a grade of an area of the road beneath the towing vehicle 10. A trailer vehicle road grade $RG_{TRAILER}$ is a grade of a road beneath the trailer vehicle 14. In this example, the trailer vehicle road grade $RG_{TRAILER}$ and the towing vehicle road grade $RG_{TOWING}$ are the same in FIG. 1, and different in FIG. 2. In FIG. 2, the trailer vehicle road grade $RG_{TRAILER}$ is greater than the towing vehicle road grade $RG_{TOWING}$ of FIG. 1.

The towing vehicle 10 includes a sensor assembly 20 that monitors the towing vehicle road grade $RG_{TOWING}$. The assembly may include accelerometers, wheel speed sensors, etc. A person having skill in this art and the benefit of this disclosure would understand how to monitor, or estimate, the towing vehicle road grade $RG_{TOWING}$ using the sensor assembly 20.

The towing vehicle 10 further includes a controller assembly 30 coupled to the sensor assembly 20. The controller assembly 30 is a specialized controller programmed to estimate the trailer vehicle road grade $RG_{TRAILER}$ based, in part, on the towing vehicle road grade $RG_{TOWING}$. The controller assembly 30 and sensor assembly 20 together provide a trailer vehicle road grade assembly or a system for controlling the trailer vehicle 14.

Notably, the example trailer vehicle 14 includes no sensor assembly or controller assembly for monitoring the trailer vehicle road grade $RG_{TRAILER}$. In other examples, the trailer vehicle 14 may include the sensor assembly 20, the controller assembly 30, or both.

Although described as road grade, a person having skill in this art and the benefit of this disclosure would understand that a traditional road is not required for there to be a road grade. Road grade refers generally to the area underneath a vehicle whether that area is a road or that area is an off-road.

The example towing vehicle 10 of FIG. 1 is configured to automatically back up the trailer vehicle 14 to the position of FIG. 2. That is, an operator of the towing vehicle 10 is not actively steering, accelerating, or decelerating the towing vehicle 10 during the reversing movement from the position of FIG. 1 to the position of FIG. 2.

In one example, the controller assembly 30 programmed to execute an automatic backup assist program to move the trailer vehicle 14 from the position of FIG. 1 to the position of FIG. 2. When backing up the trailer vehicle 14, the automatic backup assist program compensates for changes in road grade beneath the trailer vehicle 14. The estimated road grade beneath the trailer vehicle 14 is continually calculated and provided as an input to the automatic backup assist program.

The automatic backup assist program may react to changes in the road grade beneath the trailer vehicle 14 by automatically applying more frictional braking force, for example.

Methods for estimating road grade have been developed. Examples of such methods are disclosed in application Ser. No. 13/735,327, the entirety of which is incorporated herein by reference.

These methods however are most useful for estimating road grade when the towing vehicle 10 and the trailer vehicle 14 are moving forward and the towing vehicle 10 is pulling the trailer vehicle 14. The examples disclosed herein utilize the general concept of these methods as a starting point to determine automatically the estimated road grade beneath the trailer vehicle 14 when the trailer vehicle 14 moves in reverse from the position of FIG. 1 to the position of FIG. 2.

Figure 3:
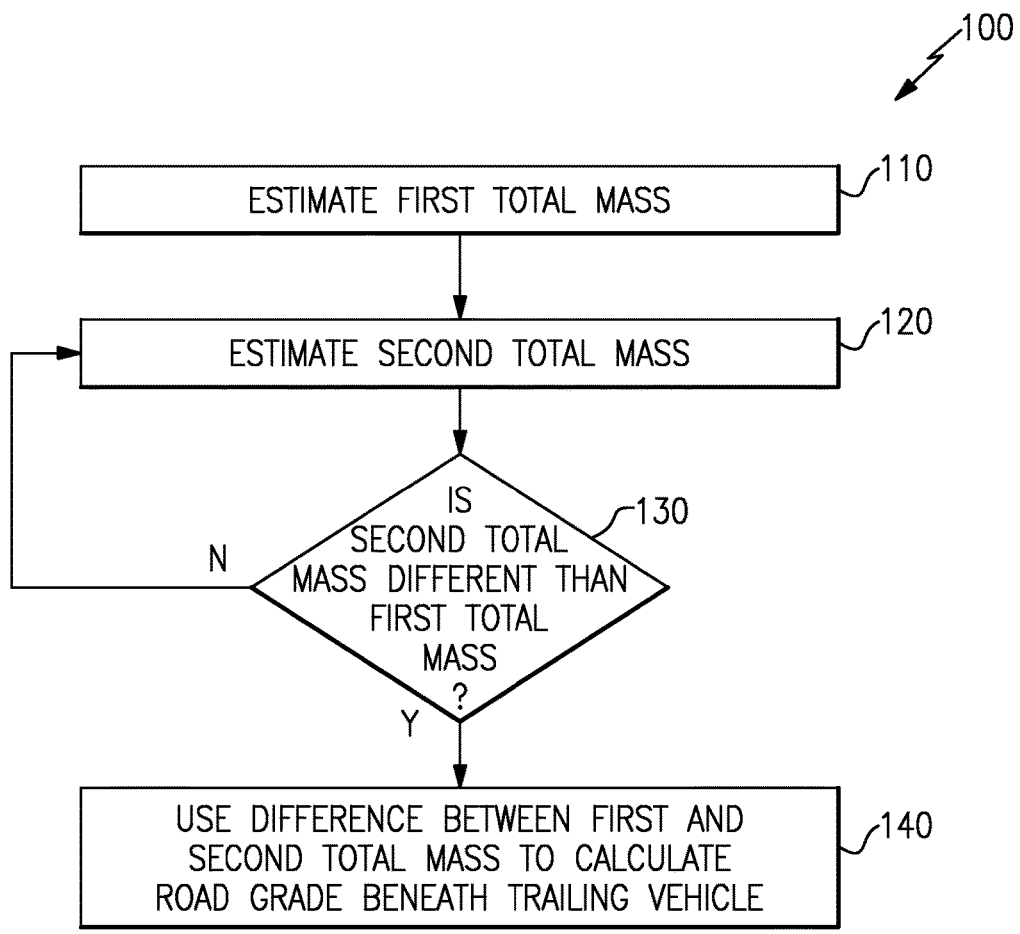
FIG. 3 shows the flow of an example method for determining the road grade beneath the trailer vehicle of FIGS. 1 and 2.

Referring now to FIG. 3 with continuing reference to FIGS. 1 and 2, an example trailer road grade estimating method 100 includes the step 110 of estimating a first total mass of the towing vehicle 10 and the trailer vehicle 14. The step 110 establishes a reference total mass.

Notably, road grade beneath the trailer vehicle 14 is one of the variables used to estimate the total mass. In this example, changes in the total mass are attributed to changes in the road grade beneath the trailer vehicle 14 relative to the road grade beneath the towing vehicle 10.

At a step 120, the method 100 estimates a second total mass of the towing vehicle 10 and the trailer vehicle 14. The step 120 occurs after reverse movement of the trailer vehicle 14.

At a step 130, the method 100 calculates whether the first total mass is different than the second total mass. If no, the method 100 returns to the step 120 and estimates another second total mass after more movement of the trailer vehicle 14.

If the second total mass is different than the first total mass, the method 100 moves to the step 140. At the step 140 the difference between the first total mass and the second total mass are used to calculate the road grade beneath the trailer vehicle 14.

The method 100 may then adjust the towing vehicle 10 in response to the road grade calculated in the step 140, such as by automatically applying more braking force.

In some examples, the adjustments include issuing a warning to the operator if the road grade calculated in the step 140 exceeds a threshold value, say seventeen percent. The exceeding can in a positive or a negative direction.

In other examples, the adjustments may pause an automatic backup operation if the road grade exceeds the threshold value.

If the operator is acting to back up the trailer vehicle 14 rather than the automatic backup operation, the road grade information under the trailer vehicle 14 can be used to visualize the situation or to tell the operator the vehicle is backing up at the bottom or top of a hill necessitating the operator to react.

In a more specific example of the method 100, the step 110 includes estimating the total mass of the towing vehicle 10 and the trailer vehicle 14 using Equation 1.

$$M_c = \frac{T_{pt} - T_{brk}}{R_w a_x^s} \qquad \text{Equation 1}$$

In Equation 1, $M_c$ represents the total unit mass of the towing vehicle 10 added to the total mass of the trailer vehicle 14. $R_w$ represents the wheel radius, and $a_x^s$ represents an acceleration output from an accelerometer. Also, $T_{pt}$ represents a torque output from a powertrain of the towing vehicle 10, and $T_{brk}$ represents a braking force output from a frictional brake of the towing vehicle 10, the trailer vehicle 14, or both.

Equation 1 is utilized to calculate total mass when, for example, the towing vehicle 10 and trailer vehicle 14 are moving forward.

If the towing vehicle 10 and the trailer vehicle 14 stray from forward movements and, for example, begin to reverse, the example method 100 uses an alternative formula to instantaneously estimate mass the of the towing vehicle 10 and the trailer vehicle 14.

Equation 2 shows an example formula that demonstrates relationships between variables when the towing vehicle 10 and the trailer vehicle 14 are reversing.

$$\breve{M}_c = M_c + m_{tlr}g\frac{(\sin\alpha_{r2} - \sin\alpha_{r1})}{a_x^s} = \frac{T_{pt} - T_{brk}}{R_w a_x^s} \quad \text{Equation 2}$$

Regarding the variables introduced in Equation 2, $\breve{M}_c$ is the instantaneously estimated mass for the towing vehicle 10 plus the trailer vehicle 14, $\alpha_{r1}$ is a road grade under the towing vehicle 10, g represents the gravity of earth, and $\alpha_{r2}$ is the road grade under the trailer vehicle 14.

Changes in the instantaneously estimated mass $\breve{M}_c$ as the towing vehicle 10 and the trailer vehicle 14 reverse are used to determine the grade under the trailer vehicle 14, $\alpha_{r2}$.

To derive the grade under the trailer vehicle 14, $\alpha_{r2}$, the changes in the instantaneously estimated mass $\breve{M}_c$ are determined using the formula represented in Equation 3.

$$RG_{load}^+ = m_{tlr}g(\sin\alpha_{r2} - \sin\alpha_{r1}) = (\breve{M}_c - M_c)a_x^s \quad \text{Equation 3}$$

In the example of Equation 3, $RG_{load}^+$ represents changes in load due to changes in road grade beneath the towing vehicle 10 relative to the trailer vehicle 14. The estimated road grade beneath the trailer vehicle 14, $\alpha_{r2}$, is then determined using the formula represented by Equation 4, which is shown below.

$$\alpha_{r2} = a\sin\left[\frac{(\breve{M}_c - M_c)a_x^s}{(M_c - m_{trk}^*)g} + \sin\alpha_{r1}\right] \quad \text{Equation 4}$$

In Equation 4, $m^*_{trk}$ is an estimated mass of the towing vehicle 10. A person having skill in this art and the benefit of this disclosure would be able to calculate the mass of the towing vehicle 10 by weighing the towing vehicle 10 or through some other technique.

A first technique uses a constant value of the truck curb weight as $m^*_{trk}$. Such a nominal value may be evaluated during or after assembling the towing vehicle 10 at a factory and may be based on the standard truck loading condition. In such an example, $m^*_{trk}$ would remain constant.

In a second example technique, $m^*_{trk}$ may be an estimated mass based on the towing vehicle 10 mass for a specific trip. This is useful when, for example, the towing vehicle 10 is periodically heavily loaded with cargo. This second technique provide a better estimate than the constant of the first technique.

The mass of the towing vehicle 10 for the second example technique may be obtained using many different methods.

An example is to estimate mass of the towing vehicle 10 using active suspension sensor. Deflection of the active suspension sensor at a steady state tells the load variation on truck unit. The estimated truck unit mass $m^*_{trk}$ in such an example will be the truck curb weight plus the indicated load weight from the suspension deflection.

The estimated road grade beneath the trailered vehicle can, as previously described, result in a warning being issued to the operator or a pause in an automatic backup procedure. In some examples, the estimated road grade can be used to calculate a total road grade torque exerted on the towing vehicle 10. This total road grade torque, represented as $\tau_{rgl}$, can be calculated using the formula represented in Equation 5.

$$\tau_{rgl} = (M_c - m^*_{trk})g\sin\alpha_{r2} + m^*_{trk}g\sin\alpha_{r1} \quad \text{Equation 5:}$$

The total road grade torque can, for example, be used as a feedforward compensating torque used to control the backup speed of the trailer vehicle 14 during an automatic backup procedure. The total road grade torque information can be utilized to maintain a relatively smooth and consistent backup speed, like cruise control for forward driving (but at a much lower speed).

Features of the disclosed examples include estimating a road grade beneath the trailer vehicle when a towing vehicle is reversing the trailer vehicle.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A trailer road grade estimating method, comprising:
altering operation of a towing vehicle in response to a road grade beneath a trailer vehicle, the road grade calculated by a controller and being based on a difference between a first estimate of a mass and a second estimate of the mass.

2. The method of claim 1, further comprising calculating the first estimate when the trailer vehicle is at a first position and calculating the second estimate when the trailer vehicle is at a second position different than the first position.

3. The method of claim 2, wherein the method comprises pushing the trailer vehicle with the towing vehicle to move the trailer vehicle from the first position to the second position.

4. The method of claim 1, wherein the first estimate comprises an estimate of a total mass of the towing vehicle and a total mass of the trailer vehicle.

5. The method of claim 2, further comprising running an automatic backup assist for the towing vehicle coupled with the trailer vehicle during the calculating.

6. A trailer road grade estimating method, comprising:
altering operation of a towing vehicle in response to a road grade beneath a trailer vehicle, the road grade calculated by a controller and being based on a difference between a first estimate of a mass and a second estimate of the mass,
wherein a variation between a grade beneath the towing vehicle and a grade beneath the trailer vehicle causes the difference between the first estimate of the mass and the second estimate of the mass.

7. The method of claim 1, wherein the calculating comprises deriving the road grade according to a formula where the road grade is α sin $$a\sin\left[\frac{(\tilde{M}_c - M_c)a_x^s}{(M_c - m_{trk}^*)g} + \sin\alpha_{r1}\right].$$

8. The method of claim 1, further comprising braking the towing vehicle, the trailer vehicle, or both in response to an increase in the road grade.

9. The method of claim 8, wherein the braking comprises friction braking.

10. The method of claim 1, further comprising sending a warning to an operator of the towing vehicle if the road grade exceeds a threshold value.

11. The method of claim 1, further comprising pausing an automatic backup operation if the road grade exceeds a threshold value.

12. The method of claim 9, further comprising calculating a total road grade load torque on the towing vehicle based on the difference.

13. The method of claim 12, wherein the total road grade load torque is calculated according to a formula wherein the total road grade load torque is:

$$(M_c - m^*_{trk})g \sin\alpha_{r2} + m^*_{trk}g \sin\alpha_{r1}.$$

14. A vehicle control assembly, comprising:
a vehicle controller that estimates a road grade for a trailer vehicle based on a difference between a first estimate of a mass and a second estimate of the mass and provides an input that alters operation of a towing vehicle in response to the road grade.

15. The assembly of claim 14, wherein the first estimate of a mass is calculated when the trailer vehicle is at a first position and the second estimate of a mass is calculated when the trailer vehicle is at a second position different than the first position.

16. The assembly of claim 15, wherein the trailer vehicle is moved in reverse from the first position to the second position.

17. The assembly of claim 14, wherein the vehicle controller estimates the road grade using a formula where the road grade is α sin $$\left[\frac{(\check{M}_c - M_c)a_x^s}{(M_c - m_{trk}^*)g} + \sin\alpha_{r1}\right].$$

18. The assembly of claim 14, including a friction brake, the vehicle controller to increase braking force from the friction brake in response to an increase in the road grade.

19. A vehicle control assembly, comprising:
a vehicle controller that estimates a road grade for a trailer vehicle based on a difference between a first estimate of a mass and a second estimate of the mass and provides an input that alters operation of a towing vehicle in response to the road grade,
wherein the vehicle controller executes a program causing a towing vehicle to automatically back up the trailer vehicle.

20. The assembly of claim 14, wherein the towing vehicle houses the vehicle controller.

21. The method of claim 13, wherein $M_c$ represents a total unit mass of the towing vehicle added to a total mass of the trailer vehicle, $m^*_{trk}$ represents an estimated mass of the towing vehicle, $\alpha_{r1}$ represents a road grade under the towing vehicle, g represents gravity, and $\alpha_{r2}$ represents a road grade under the trailer vehicle.

22. The assembly of claim 17, wherein $\check{M}_c$ represents an estimated mass for the towing vehicle and the trailer vehicle, $M_c$ represents the total unit mass of the towing vehicle added to the total mass of the trailer vehicle, $a_x^s$ represents an acceleration output from an accelerometer, $m^*_{trk}$ represents an estimated mass of the towing vehicle, g represents gravity, and $\alpha_{r1}$ represents a road grade under the towing vehicle.

* * * * *

UNITED STATES PATENT AND TRADEMARK OFFICE
CERTIFICATE OF CORRECTION

PATENT NO. : 9,744,970 B2
APPLICATION NO. : 14/330622
DATED : August 29, 2017
INVENTOR(S) : Hai Yu It is certified that error appears in the above-identified patent and that said Letters Patent is hereby corrected as shown below:

In the Claims

In Claim 7, Column 6, Line 67; after "the road grade is" delete "α sin"

In Claim 17, Column 8, Line 3; after "road grade is" delete "α sin"

In Claim 17, Column 8, Line 5; replace "$\left[\frac{(\tilde{M}_c - M_c)a_x^s}{(M_c - m_{trk}^*)g} + \sin \alpha_{r1}\right]$," with -- $a\sin\left[\frac{(\tilde{M}_c - M_c)a_x^s}{(M_c - m_{trk}^*)g} + \sin \alpha_{r1}\right]$ --

Signed and Sealed this
Fifteenth Day of May, 2018

Andrei Iancu
*Director of the United States Patent and Trademark Office*